United States Patent [19]

Sloan

[11] 4,207,921
[45] Jun. 17, 1980

[54] HEADER ASSEMBLY AND JETTING ADAPTER FOR WELL POINT PUMPING APPARATUS

[76] Inventor: Albert H. Sloan, 4201 Kean Rd., Fort Lauderdale, Fla. 33314

[21] Appl. No.: 922,039

[22] Filed: Jul. 5, 1978

[51] Int. Cl.² .................... F16L 29/00; F16L 37/28; F16L 41/04
[52] U.S. Cl. .................................... 137/616; 285/162
[58] Field of Search .................. 137/615, 801, 616; 285/162

[56] References Cited

U.S. PATENT DOCUMENTS

| 3,434,746 | 3/1969 | Watts | 285/162 |
| 3,677,578 | 7/1972 | Roos | 285/162 |
| 4,029,438 | 6/1977 | Sloan | 417/200 |

FOREIGN PATENT DOCUMENTS

2358325  6/1974  Fed. Rep. of Germany ........... 285/162

*Primary Examiner*—Martin P. Schwadron
*Assistant Examiner*—A. Michael Chambers
*Attorney, Agent, or Firm*—James E. Nilles

[57] ABSTRACT

A pipe header assembly for well point pumping apparatus for use with a series of well point risers forced into the ground and extending above ground where they are connected to a pipe header whereby water is pumped out of the ground and conveyed through the pipe header to the pumping apparatus for discharge elsewhere. The assembly includes swing arms connected to the pipe header by an improved slip joint at one end of the swing arms and located between the swing arms and the header and by means of which the swing arms can be inserted in or removed from the pipe header without the necessity of saddles, fittings, threaded joints, or other connections.

A tool, referred to as a jetting adapter is also provided for quick connection to a plain end of the well point risers, which adapter can be simply slipped over a plain end of the riser where it then automatically locks on the riser. The adapter also has a quick sealing joint with the riser and furthermore has a threaded pipe connection with a supply pipe for furnishing pressure fluid to the riser when sinking the latter. The adapter is used for sinking the well point risers into the ground, and it can also be used to pull the riser out of the ground.

4 Claims, 14 Drawing Figures

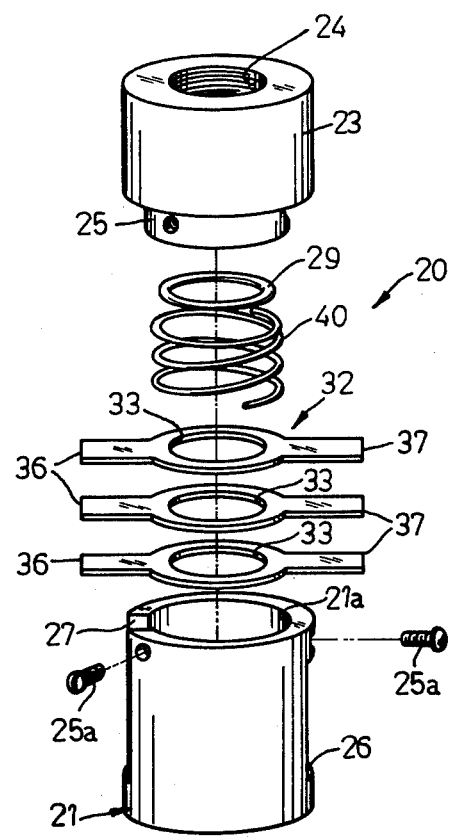
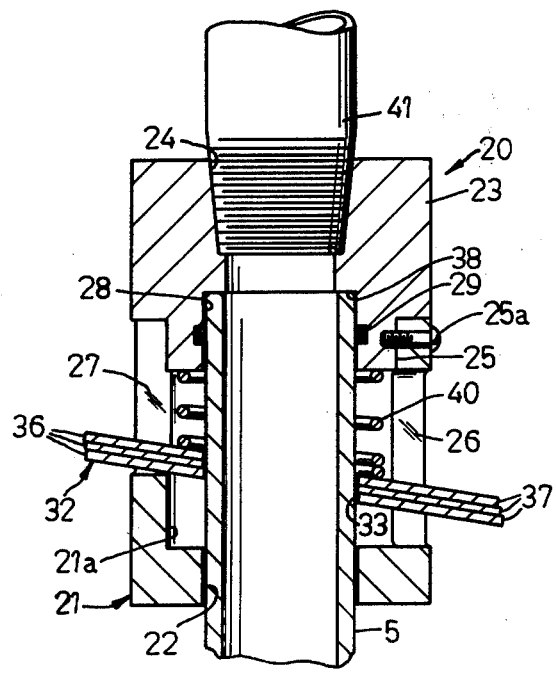
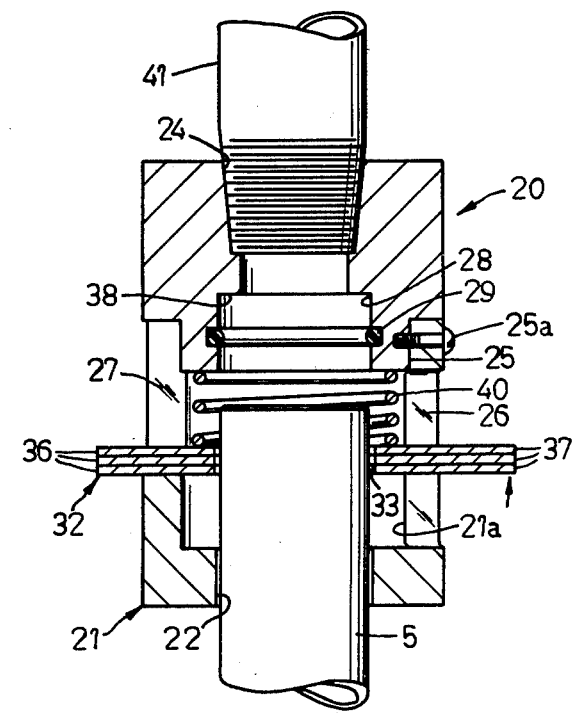

HEADER ASSEMBLY AND JETTING ADAPTER FOR WELL POINT PUMPING APPARATUS

BACKGROUND OF THE INVENTION

The invention pertains generally to apparatus for pumping water out of the ground by means of a series of individual well point risers which are connected to a common pipe header that in turn is connected with water pumping apparatus. An example of this general type of apparatus is shown in my U.S. Pat. No. 4,029,438, issued June 14, 1977 and entitled "Well Point Pumping System and Pump Assembly Therefor."

SUMMARY OF THE INVENTION

The present invention provides a header assembly for apparatus for pumping water from the ground by means of a series of individual well point risers, which extend above the ground. The header assembly includes a swing arm having a resilient slip joint which is quickly and easily attached to a header pipe and easily removed therefrom, all without the necessity of providing saddles, fittings, threaded joints, swingable locking handles, or other connections between the swing arm and header, and is economical to manufacture. This aspect of the invention contemplates the use of a plain pipe end of the swing arm being covered with a tubular rubber or flexible member which simply slips into a hole in the header pipe and is automatically sealed therewith, no other attaching parts, fittings, or weldments being required. Although the slip joint connection is simple, it is accurate, performs the sealing function without leaks, is fool-proof to set up, operate, and disassemble, all without special tools and by inexperienced operators.

The swing arm may also include a shut-off valve which can be closed during the initial operation of the pump to thereby enhance priming thereof by restricting the flow of air from the risers. After initial operation of the pump and withdrawal of the air from the system, the shut-off valves can be opened for full fluid capacity therethrough.

With the pipe joint connection provide by the present invention between the swing arm and the pipe header, quick set up and dismantling of the assembly is ensured, and breakage of joints or parts is minimized when the system is dismantled and transported. The assembly is easily and completely disassembled or assembled and readily stored or transported elsewhere.

The present invention finds particular utility when used with a tool, referred to as a jetting adapter and which is used to sink the risers into the ground and which can also be used to pull the risers from the ground after the dewatering operation. More specifically, the jetting adapter can be simply slipped over the plain end of a riser and automatically locked thereon. The adapter forms a fluid tight seal with the riser and can be threadably connected to a pressure fluid supply line for furnishing pressure fluid to the riser as the latter is sunk into the ground. When the riser sinking operation has been completed, the adapter is easily removed from the riser simply by lifting the canted rings in the adapter which grip or bite the plain end of the riser. The rings are spring biased to lock the adapter on the riser and when it is desired to remove the adapter from the riser, it is only necessary to lift one side of the canted rings and lift the adapter off the riser. After the dewatering operation, when it is desired to remove the riser from the ground, the adapter is simply lowered over the plain end of the riser where it then automatically locks on the riser. Thus, the adapter can be easily placed on or removed from the riser, both for the riser sinking operation and, after the dewatering process has been completed, the adapter is used for the riser pulling operation, and for this purpose, the adapter has a threaded pipe connection with the fluid pressure supply line and a quick sealing joint with the plain end of the riser.

These and other objects and advantages of the present invention will appear hereinafter as this disclosure progresses, reference being had to the accompanying drawings.

BRIEF DESCRIPTION OF THE DRAWINGS

FIG. 8 is a perspective, exploded view of the jetting adapter made in accordance with the present invention;

FIG. 9 is a vertical, sectional view of the jetting adapter in assembled, locked position on a well point riser;

FIG. 10 is a view similar to FIG. 9, but showing the canted locking rings when raised to the adapter released position;

DESCRIPTION OF A PREFERRED EMBODIMENT

Figure 1:
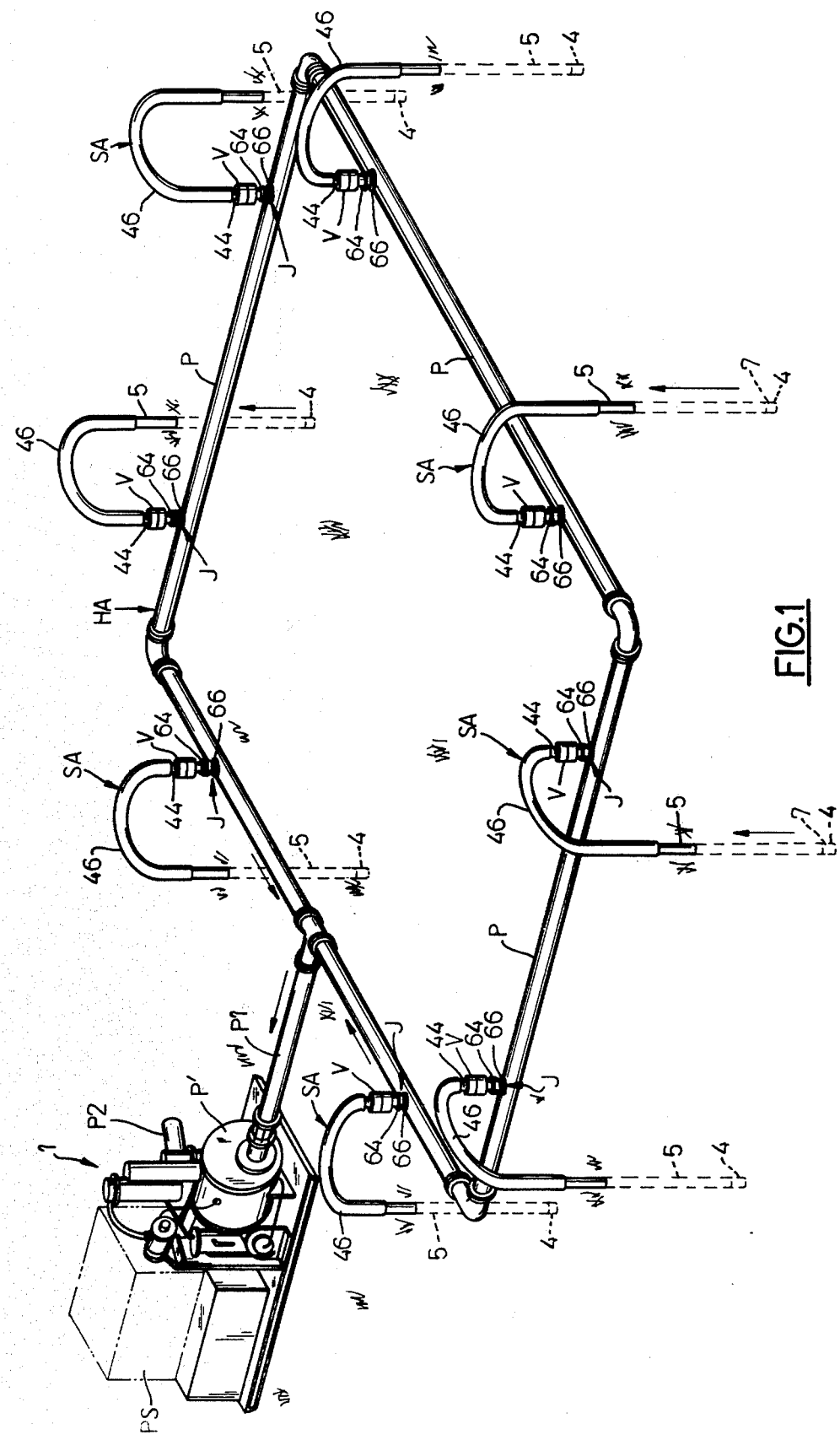
FIG. 1 is a perspective view of well point pumping apparatus embodying the present invention.

The general organization of the apparatus is shown in FIG. 1 and includes a pump assembly 1 which is used to pump water out of the ground through the header assembly HA to be described, and it is not believed desirable nor necessary to describe this pump assembly in detail. It is believed sufficient to say that the apparatus includes a fluid pump P', driven by a power source PS, which pump draws water in through an inlet pipe PI and discharges it via outlet P2 for conveyance elsewhere. If further details of the structure or operation of that pump assembly is deemed to be either necessary or desirable, reference may be had to my said U.S. Pat. No. 4,029,438.

The header assembly HA is shown in FIG. 1 and includes a relatively large diameter pipe P preferably formed of PVC plastic which pipe is assembled in a desired pattern over the ground, such as a generally rectangular pattern as shown for over-laying the area of the ground which is to be dewatered. The connecting or inlet pipe P1 connects the generally rectangular loop of pipe with the pump P' so that the pipe P is under vacuum and water flows through the pipe in the directions indicated by the arrows.

A series of well points 4 are located at the lower end of the vertically disposed risers 5. The well points 4 are conventional in character and are also shown and described in my said U.S. Pat. No. 4,029,438 and it is believed sufficient to say that the well points and risers are forceably inserted into the ground by water forced under pressure through the risers and through the check valve 7 at the lower end of the well point. This permits the riser 5 and its well point 4 to be forced into the ground to a position where the upper plain end of the riser is located above the ground. It will be noted that the riser when used with the present invention requires only a plain upper end as clearly shown in FIGS. 9 and 10, being unnecessary to provide that upper end of the riser with a threaded connection, weldments, or other fastening means.

As clearly shown in FIGS. 8, 9, and 10, a jetting adapter 20 is located on the upper plain end of each of the risers 5 by simply being inserted over the upper plain end of the riser. More specifically, the cylindrical adapter housing includes a lower portion 21 having a central aperture or opening 22 for being inserted over the riser. It will be noted the lower portion 21 has a pair of diametrically opposed and vertically disposed slots 26, 27 in its side walls. The adapter also has an upper cylindrical portion 23 with a swing arm connecting means in the form of a threaded central aperture 24 at its upper end. The upper portion 23 of the adapter also has a reduced lower portion 25 which slips into the upper end of the lower adapter portion 21. The upper portion 23 of the adapter furthermore has a bore 28 in its lower end and into which the riser is inserted in sealing relationship by means of the O-ring 29 within the counterbore 28.

The lower portion 21 also has a central counterbore 21a into which the reduced portion 25 of the upper portion telescopes and is held captive by a series of circumferentially spaced screws 25a (only one shown in FIG. 10). Thereby the upper and lower portions can be easily disassembled for removal of its interior parts to be described.

A plurality of case-hardened steel flat rings 32 have central openings 33 of such diameter that they slip over the riser when they are positioned normal to the riser as shown in FIG. 10. The opposite ends 36 and 37 of the flat rings 32 extend outwardly through the slots 27 and 26, respectively, of the adapter. Thus, the adapter is slipped over the riser so that the upper end of the riser abuts against the shoulder 38 of the adapter in sealing relationship therewith. A spring 40 located within the adapter surrounds the upper end of the riser and urges the flat locking rings 32 to the locking or canted position shown in FIG. 9. When in this canted position, the edges of the central opening of the flat rings 32 bite against the periphery of the riser to form a tight engagement therewith. When in this position, the adapter can be grasped and lifted to thereby pull the riser forceably from the ground.

As previously indicated, the risers are forceably inserted into the ground by water which is conducted into and through the risers, and the operation of the jetting adapter 20 is as follows. The jetting adapters 20 are first inserted over the plain end of the risers and are connected by a conventional supply pipe 41 through which water under pressure from a source (not shown) is conducted into the riser. The seals 29 provide a fluid-tight connection during this operation between the adapter and the riser. Thus, the pressure fluid introduced into the riser acts to sink the riser into the ground, the fluid exiting from the lower end of the riser through the one-way check valve 4 at the bottom of the riser. After the riser has thus been forceably inserted into the ground, the adapter is easily removed from the upper end of the riser by lifting the canted rings, thus freeing them from the riser and thus permitting the adapter to be lifted off the end of the riser. The riser is then connected to the other end of the flexible conduit swing arm SA (to be described) which is simply being tightly press-fit over the upper plain end of the riser as shown in FIG. 1 or by other connecting means.

After the water pumping operation is completed, the risers can be easily removed from the ground by again lowering the adapter over the plain uper end of the riser and then pulling the adapter upwardly by any suitable means, thereby pulling the riser out of the ground. To then remove the adapter completely from the riser, it is only necessary to again raise the lower end of the locking rings 32 as indicated by the arrow in FIG. 10, thus releasing the adapter and more specifically, the rings from their biting action on the periphery of the riser and the adapter can then be simply lifted off the riser.

Referring now in greater detail to the swing arm SA, it includes a flexible conduit 46 made of flexible material such as rubber, plastic, or the like, which is tightly inserted over the plain end of a threaded pipe nipple 44 (FIG. 2) of the swing arm SA. The other end of the nipple 44 is threaded for connection to a shut off valve V to now be described, it being understood that other forms of shut off valves can be used.

The shut-off valve V is located at the other end of the swing arm (FIG. 2), and the purpose of this valve is to regulate the flow of water and/or air from the risers 5 into the header pipe P if and when required. The valve is operated simply by twisting its upper portion 50 relative to its lower portion 51 thereby misaligning the holes 52 and 53 located, respectively, in the portions 50 and 51. Portions 50 and 51 of the valve are held together by a nut 56 which is threadably engaged in the upwardly extending, central integral stem 57 of the lower portion 51. O-rings 58 are located in the lower portion 51 around its openings 53 to effect the seal between the upper and lower portions.

The upper and lower portions 50 and 51 are inserted by their reduced portions 59 and 60, respectively, into a central band member 62 which has O-rings 63 around its internal surface to form a sealing engagement with the periphery of the upper and lower portions of the valve.

The valve V itseltf is thus simply twisted to effect the flow adjustment of fluid therethrough. It uses replaceable seals, the sealing capacity of which is increased by the vacuum in the system. These valves are easily assembled and disassembled without the necessity of any tools.

The valve V is located conveniently immediately adjacent the sip joints J (FIG. 2) now to be described, formed between the end of the swing arm SA (FIG. 2) and the header pipe P.

Figure 2:
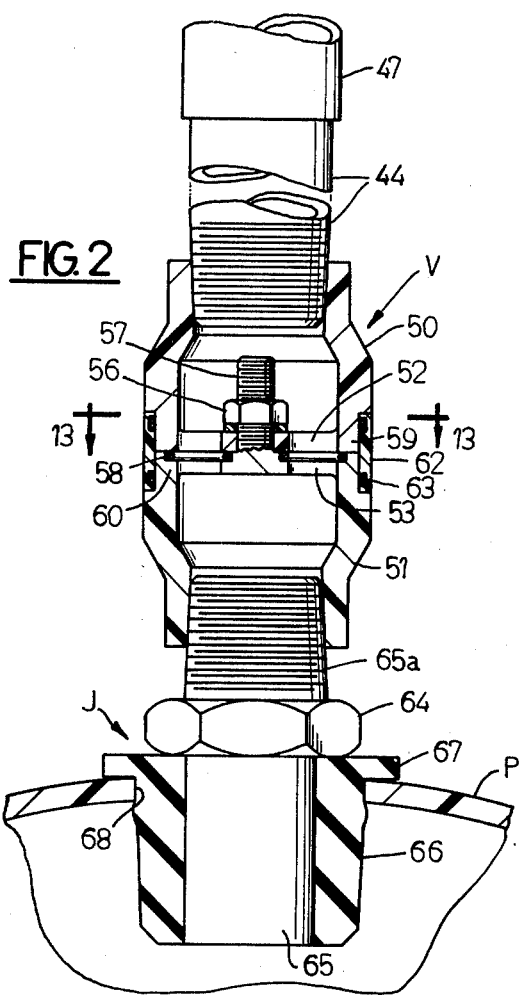
FIG. 2 is a vertical, cross-sectional view, on an enlarged scale, of one end of the swing arm having a pipe header slip joint connection made in accordance with the present invention.
Figure 5:
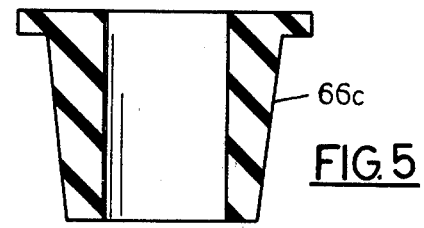
FIGS. 3-7, inclusive, are modifications of the flexible sleeve for use with a plain pipe end of the swing arm shown in FIG. 1.
Figure 3:
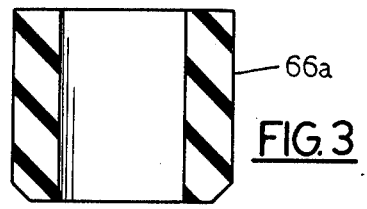
Figure 6:
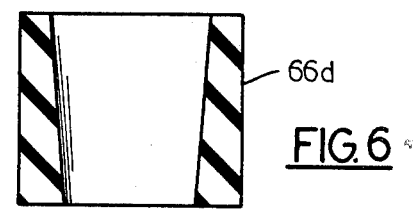
Figure 4:
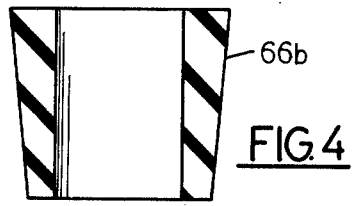
Figure 7:
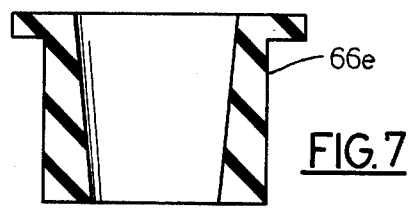
Figure 11:
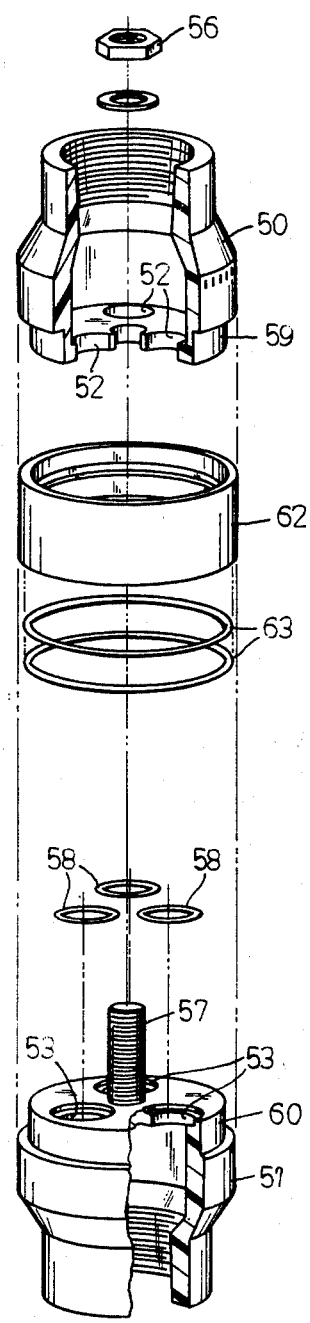
FIG. 11 is a perspective, exploded view of the shut-off valve shown in FIG. 2 in connection with the swing arm connection with the pipe header, but certain parts have also been shown as broken away or in section for the sake of clarity.
Figure 12:
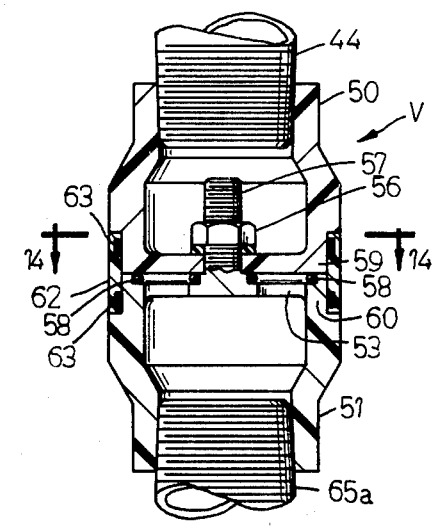
FIG. 12 is a longitudinal, cross-sectional view through the shut-off valve.
Figure 13:
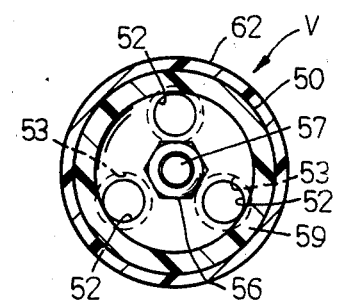
FIG. 13 is a transverse, sectional view taken generally along the line 13—13 in FIG. 2 as showing the valve in open position.
Figure 14:
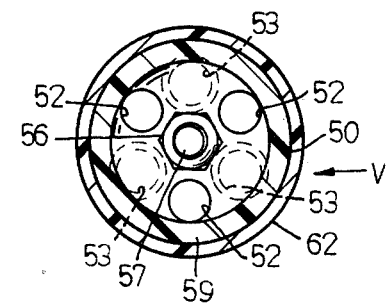
FIG. 14 is a transverse, sectional view taken generally along the line 14—14 in FIG. 12 and showing the valve in the closed position.

The swing arm slip joint J connection with the header pipe P includes a plain pipe end 65 (FIG. 2) having its upper end 65a threaded for engagement with the valve V as shown in FIG. 2. An integral nut portion 64 of the pipe 65 facilitates the threaded engagement of the pipe thread 63 into the valve V. The plain pipe end 65 has a rubber or otherwise flexible sleeve 66 securely press-fit thereon for insertion in a complementary hole 68 in the upper side of the header pipe P. The sleeve 66 has a radially extending annular flange 67 which can be drawn against the outside of the header pipe when the latter is under vacuum due to the action of the pump P', thereby increasing the sealing action.

As shown in FIGS. 3 to 7, various other forms of rubber sleeves 66a through 66e may be used depending on the size of holes in the header or sealing characteristics required. The sleeves of FIGS. 2, 5, and 7 have an outwardly extending annular flange to enhance sealing. The sleeves of FIGS. 4 and 5 have an external taper while the sleeves of FIGS. 6 and 7 have internal tapers. The sleeves of FIGS. 2 and 3 have a straight side wall.

As shown, it will be noticed the diameter of the rubber sleeve is greater than the hole 68 in the header pipe whereby the sleeve 66 deforms when forced into the header hole 68 and sealingly engages in the header pipe. Thus, the swing arm end may be easily connected to the header pipe simply by inserting the swing arm into the header pipe, but nevertheless, the joint provides an amount of play or movement of the swing arm relative to the header pipe without affecting it sealing ability.

No saddles, weldments, or threaded connections are required between the swing arm 46 and the header pipe P and rapid assembly and disassembly is possible. When disassembled, the pipes themselves are free of any protrusion or nipples which otherwise often become damaged, bent, or broken, for example, when loaded and stacked on a truck for transport.

What is claimed is:

1. A header assembly for well point pumping apparatus including a header pipe disposed over the ground to be dewatered, said header pipe having at least one hole therein, having an axis extending generally upwardly relative to said round, at least one vertically extending well point riser in the ground and having an upper end extending from said ground, said upper end including means for connection with said hole, said upper end connection means including at least one swing arm conduit connected at one end to said hole, said swing arm conduit being swingable about the axis of said hole, and being connected at its other end to said upper end of said well point riser said one end being a plain pipe end and having a flexible sleeve mounted over said end, said pipe end and said sleeve being firmly insertable in said hole and forming a sealing connection with said header pipe, whereby said swing arm end can be inserted in and removed from said hole in said header pipe.

2. The apparatus set forth the claim 1 including a shut-off valve in said swing arm conduit for restricting flow from said header pipe through said conduit.

3. The apparatus set forth in claim 2 including a threaded portion on said swing arm conduit adjacent said plain pipe end, and said valve including means threadably engaging said threaded portion.

4. Well point pumping apparatus for dewatering the ground and comprsing in combination, a header pipe disposed over the ground to be dewatered, said header pipe having a series of holes therein, and each hole having an axis extending generally upwardly relative to said ground, a series of vertically extending well point risers in the ground and having upper ends extending from said ground, each of said upper ends including means for connection with each of said holes, said upper end connection means including a series of swing arm conduits, each of said swing arm conduits respectively connected at one end in each of said holes said conduit being swingable about said axis of its respective hole, and respectively connected at its other end to the plain upper end to each of said well point risers, said swing arm conduits each having a flexible sleeve over said one end, said one end and said sleeve being firmly insertable in their respective said hole and forming a sealing connection between said conduit and said header pipe, whereby said swing arm end can be simply inserted and pushed in and removed from said hole in said header pipe.

* * * * *